US012076996B2

(12) United States Patent
Morino et al.

(10) Patent No.: US 12,076,996 B2
(45) Date of Patent: Sep. 3, 2024

(54) LIQUID DISCHARGE APPARATUS

(71) Applicants: Tetsu Morino, Kanagawa (JP); Takeyuki Kobayashi, Kanagawa (JP)

(72) Inventors: Tetsu Morino, Kanagawa (JP); Takeyuki Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 73 days.

(21) Appl. No.: 17/683,788

(22) Filed: Mar. 1, 2022

(65) Prior Publication Data

US 2022/0297434 A1 Sep. 22, 2022

(30) Foreign Application Priority Data

Mar. 17, 2021 (JP) ................................ 2021-044081
Oct. 19, 2021 (JP) ................................ 2021-170999

(51) Int. Cl.
*B41J 2/165* (2006.01)
*B41J 2/17* (2006.01)

(52) U.S. Cl.
CPC ......... *B41J 2/16523* (2013.01); *B41J 2/1721* (2013.01); *B41J 2002/1735* (2013.01)

(58) Field of Classification Search
CPC .................. B41J 2/16523; B41J 2/1721; B41J 2002/1735
See application file for complete search history.

(56) References Cited

U.S. PATENT DOCUMENTS

| | | | | |
|---|---|---|---|---|
| 2008/0049087 | A1 | 2/2008 | Morino | |
| 2008/0136864 | A1* | 6/2008 | Nakamura | B41J 2/16523 347/30 |
| 2010/0177148 | A1* | 7/2010 | Asami | B41J 2/18 347/85 |
| 2013/0176367 | A1 | 7/2013 | Morino et al. | |
| 2016/0355007 | A1 | 12/2016 | Morino et al. | |
| 2021/0229472 | A1 | 7/2021 | Morino et al. | |
| 2021/0245534 | A1 | 8/2021 | Morino et al. | |

FOREIGN PATENT DOCUMENTS

| | | |
|---|---|---|
| JP | 60264255 A * | 12/1985 |
| JP | 2008-030269 | 2/2008 |
| JP | 2012-020523 | 2/2012 |
| JP | 2013-203065 | 10/2013 |

* cited by examiner

*Primary Examiner* — Sharon Polk
(74) *Attorney, Agent, or Firm* — Harness, Dickey & Pierce, P.L.C.

(57) ABSTRACT

A liquid discharge apparatus includes an apparatus body, a liquid discharge head in the apparatus body, the liquid discharge head configured to discharge a liquid, and a waste liquid tube coupled to a coupling portion of the apparatus body, the waste liquid tube having flexibility and including a spiral structure portion at least in a part of the waste liquid tube, the waste liquid tube configured to discharge, outside the apparatus body, a waste liquid discharged from the liquid discharge head.

13 Claims, 7 Drawing Sheets

COMPARATIVE EXAMPLE 1

LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2021-044081, filed on Mar. 17, 2021, in the Japan Patent Office, and Japanese Patent Application No. 2021-170999, filed on Oct. 19, 2021, in the Japan Patent Office, the entire disclosures of which are hereby incorporated by reference herein.

BACKGROUND

Technical Field

Aspect of this disclosure relates to a liquid discharge apparatus.

Related Art

A liquid discharge apparatus generates a waste liquid by a maintenance and recovery operation of a liquid discharge device, a cleaning operation using a cleaning liquid, and the like. The waste liquid is discharged to a waste liquid container (waste liquid tank and waste liquid bottle) via a waste liquid tube or the like.

The liquid discharge apparatus uses the waste liquid tube having a deformable structure that is expand and contract such as a bellows structure or the like.

SUMMARY

In an aspect of this disclosure, a liquid discharge apparatus includes an apparatus body, a liquid discharge head in the apparatus body, the liquid discharge head configured to discharge a liquid, and a waste liquid tube coupled to a coupling portion of the apparatus body, the waste liquid tube having flexibility and at least partially including a spiral structure portion in the waste liquid tube, the waste liquid tube configured to discharge, outside the apparatus body, a waste liquid discharged from the liquid discharge head.

In another aspect of this disclosure, a liquid discharge apparatus includes an apparatus body, a liquid discharge head in the apparatus body, the liquid discharge head configured to discharge a liquid, a waste liquid tube coupled to a coupling portion of the apparatus body, the waste liquid tube having flexibility, the waste liquid tube configured to discharge, outside the apparatus body, a waste liquid discharged from the liquid discharge head, and a link mechanism configured to hold the waste liquid tube to expand and contract the waste liquid tube.

In still another aspect of this disclosure, a liquid discharge apparatus includes an apparatus body, a liquid discharge head in the apparatus body, the liquid discharge head configured to discharge a liquid, a waste liquid tube coupled to a coupling portion of the apparatus body, the waste liquid tube having flexibility, the waste liquid tube configured to discharge, outside the apparatus body, a waste liquid discharged from the liquid discharge head, and a reel configured to rotate and wind the waste liquid tube around the reel.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
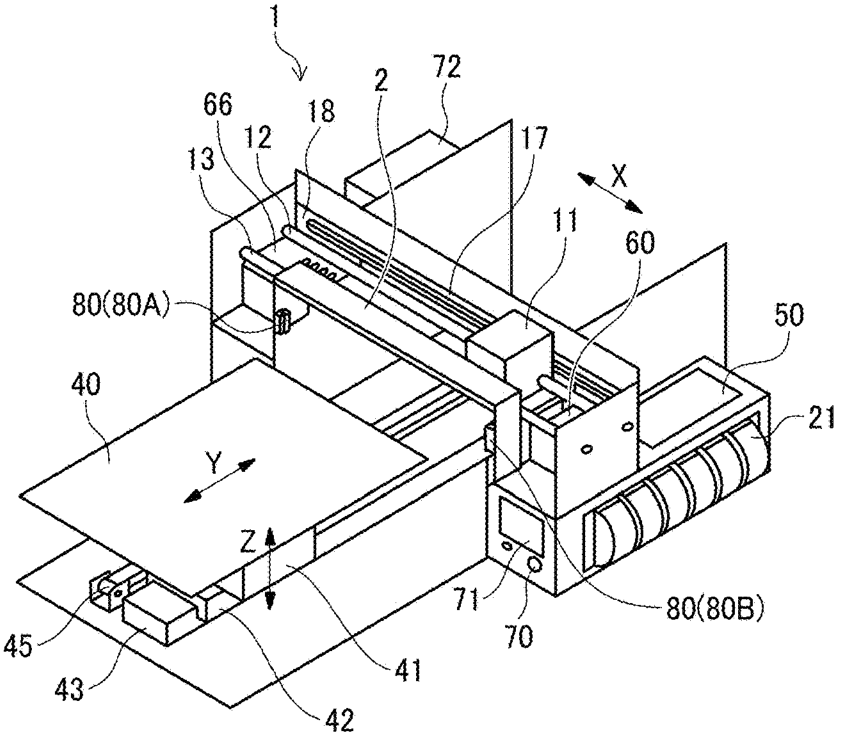
FIG. 1 is a perspective view of a printer according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

As used herein, the term "couple" includes, but is not limited to, joining, connecting, fastening, linking, or associating two things integrally or interstitially together Referring now to the drawings, wherein like reference numerals designate identical or corresponding parts throughout the several views, embodiments of the present disclosure are described below.

A printer 1 serving as a liquid discharge apparatus according to a first embodiment of the present disclosure is described with reference to FIGS. 1 to 3.

FIG. 1 is a schematic perspective view of the printer 1 according to the first embodiment.

Figure 2:
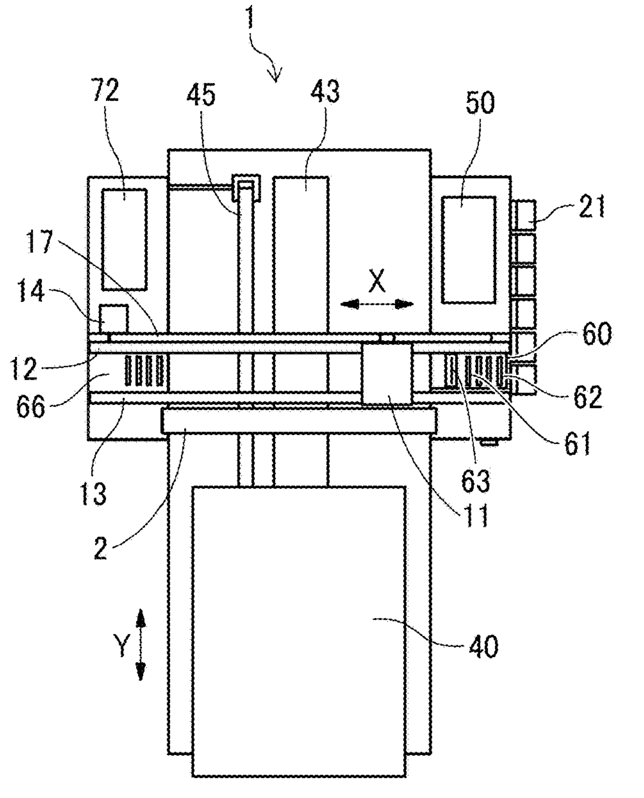
FIG. 2 is a schematic plan view of the printer of FIG. 1.

FIG. 2 is a schematic plan view of the printer 1 of FIG. 1.

Figure 3:
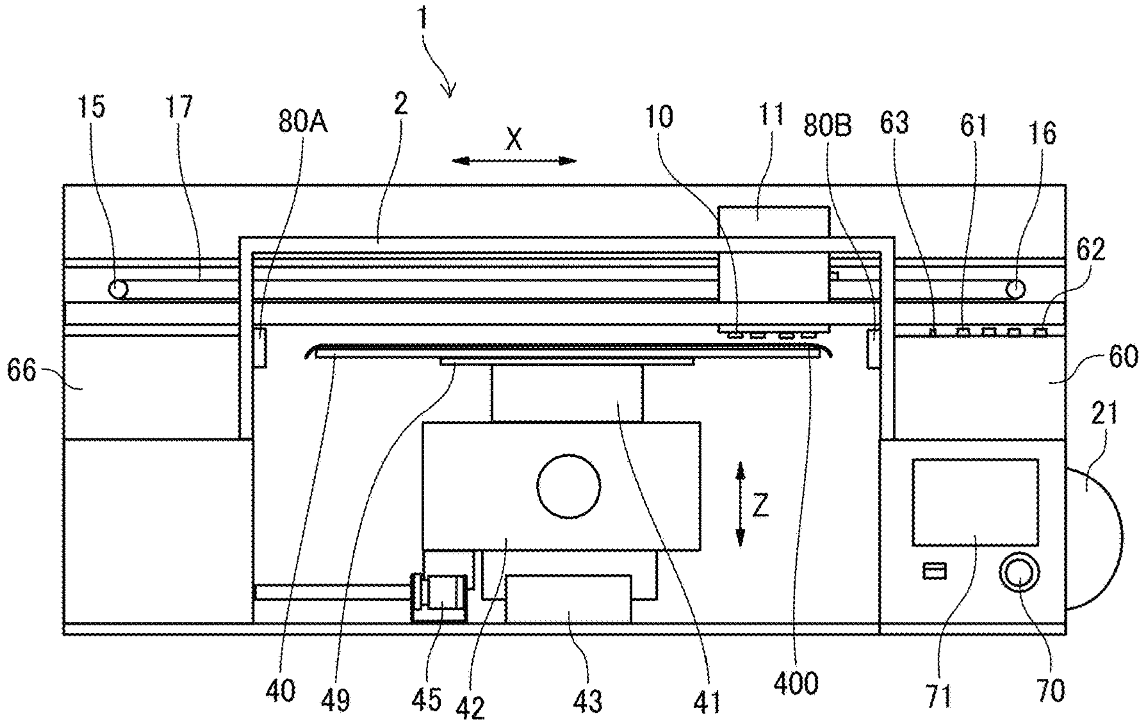
FIG. 3 is a schematic cross-sectional front view of the printer of FIG. 1.

FIG. 3 is a schematic cross-sectional front view of the printer 1 of FIG. 1.

The printer 1 includes multiple liquid discharge heads 10 (see FIG. 3) to discharge a liquid and a carriage 11 mounting the heads 10. Hereinafter, the "liquid discharge head" is simply referred to as a "head".

The guides 12 and 13 holds the carriage 11 such that the carriage 11 is reciprocally movable in a main-scanning direction indicated by arrow "X" in FIG. 1. The carriage 11 is coupled to a timing belt 17 wound around a drive pulley 15 driven by a main-scanning motor 14 and a driven pulley 16 (see FIGS. 2 and 3). The main-scanning motor 14 is driven to reciprocally move the carriage 11 in the main-scanning direction X.

The printer 1 includes an encoder sheet 18 arranged along the main-scanning direction X. The encoder sheet 18 includes slits periodically formed in the encoder sheet 18. The carriage 11 includes a reading sensor that reads the slits in the encoder sheet 18. The printer 1 can detect the position of the carriage 11 in the main-scanning direction X from a reading result of the reading sensor.

The printer 1 includes a controller board 50 that controls the heads 10 to discharge an ink as a liquid from the heads 10 at a timing when the carriage 11 is moved to a discharge position. A position of the carriage 11 (carriage position) is obtained from the reading result of the reading sensor of the carriage 11.

The printer 1 includes four of the heads 10 mounted on the carriage 11 (see FIG. 3). Each of the heads 10 includes two rows of nozzle arrays on a nozzle surface of the heads 10. Each nozzle arrays includes nozzles from which a liquid is discharged. The carriage 11 also mounts a sub tank to temporally store a liquid to be supplied to the heads 10. A liquid of desired color is supplied from a main tank 21 to the sub tank via a supply tube by a liquid feed pump.

The printer 1 includes a platen 40 as a holder to hold a fabric 400 as a print target (liquid application target) onto which a liquid is discharged from the heads 10.

The platen 40 is detachably held by a receiver 49. The receiver 49 is attached to an elevator 41. Accordingly, the elevator 41 can adjust a height of the platen 40 in a vertical direction Z. The printer 1 includes a slider 42 on which the elevator 41 of the platen 40 is mounted. The printer 1 includes a slider rail 43 on which the slider 42 is movably mounted. The slider rail 43 is extended along a sub-scanning direction indicated by arrow "Y." The sub-scanning direction Y is orthogonal to the main-scanning direction X. Thus, the slider 42 moves along the slider rail 43 in the sub-scanning direction Y.

The slider 42 is reciprocally movable in the sub-scanning direction Y via a timing belt 45 by a sub-scan drive mechanism. The slider 42 is reciprocally moved in the sub-scanning direction Y to reciprocally move the platen 40 in the sub-scanning direction.

The printer 1 includes a maintenance unit 60 to maintain and recover a discharge function the head 10. The maintenance unit 60 is disposed on one side (right-side in FIG. 1) of the printer 1 in the main-scanning direction X. The maintenance unit 60 includes a suction cap 61, a moisture-retention cap 62, and a wiper 63. The suction cap 61 caps the nozzle surface of the head 10. The moisture-retention cap 62 caps the nozzle surface of the head 10 to keep moisture in the nozzles of the head 10. The wiper 63 wipes the nozzle surface of the head 10. The suction cap 61 is coupled to a suction pump serving as a suction device.

The printer 1 includes a discharge receptacle 66 on another end (left end in FIG. 1) of the printer 1 in the main-scanning direction X. The controller board 50 controls the head 10 to discharge the liquid to the discharge receptacle 66 during printing to maintain and recover the discharge function of the head 10.

Further, the printer 1 includes a height detector 80 that includes a light emitter 80A and a light receiver 80B respectively disposed on one end (left end in FIG. 1) and on another end (right end in FIG. 1) of the printer 1 in the main-scanning direction X. The height detector 80 detects the fabric 400 on the platen 40. The height detector 80 is attached to a frame 2 of the printer 1.

Further, the printer 1 includes a power button 70, an operation panel 71, a power supply unit 72, and the like.

When the printer 1 prints on a fabric 400 (print target) such as a T-shirt, the fabric 400 is set on the platen 40. Then, the operation panel 71 is operated to completely pulls the platen 40 in a rear direction (upper-right hand direction in FIG. 1) of the printer 1 by moving the slider 42.

When the platen 40 is pulled into the printer 1, the printer 1 detects whether the fabric 400 on the platen 40 interferes with the head 10 using the height detector 80. When the printer 1 determines that the head 10 interferes (collides) with the fabric 400 from the reading result of the height detector 80, the printer 1 stops pulling of the platen 40 inside the printer 1 or moves the platen 40 back to an initial set position (lower-left position in FIG. 1) of the platen 40 at which the fabric 400 is to be set on the platen 40 by the operator (user).

When the platen 40 is fully (completely) pulled inside the printer 1 (end of pull-in operation), the printer 1 becomes a print-data standby state in which the printer 1 waits for receiving print data from an external information processing device. The printer 1 starts a print operation when the printer 1 receives the print data from the external information processing device. Alternatively, the printer 1 may select the print data by the operation panel 71 to start the print operation when the print data is previously stored in the controller board 50.

When the printer 1 starts the print operation, the printer 1 moves the slider 42 to move the platen 40 to a printing start position at which the printer 1 starts the print operation. Then, the printer 1 moves the carriage 11 while discharging a liquid from the head 10 to perform one line of printing on the fabric 400. When the printer 1 prints one line, the printer 1 moves the slider 42 to move the platen 40 by one line.

The printer 1 intermittently repeats one scanning movement of the carriage 11 in the main-scanning direction X and one movement of the slider 42 in the sub-scanning direction Y to print an image on a desired region on the fabric 400. The printer 1 moves the platen 40 back to a front side (lower left side in FIG. 1) of the printer 1 to finish the print operation. The initial set position (lower-left position in FIG. 1) is located at the front side of the printer 1.

A waste liquid tube 103 of the printer 1 according to the first embodiment of the present disclosure is described with reference to FIG. 4.

Figure 4:
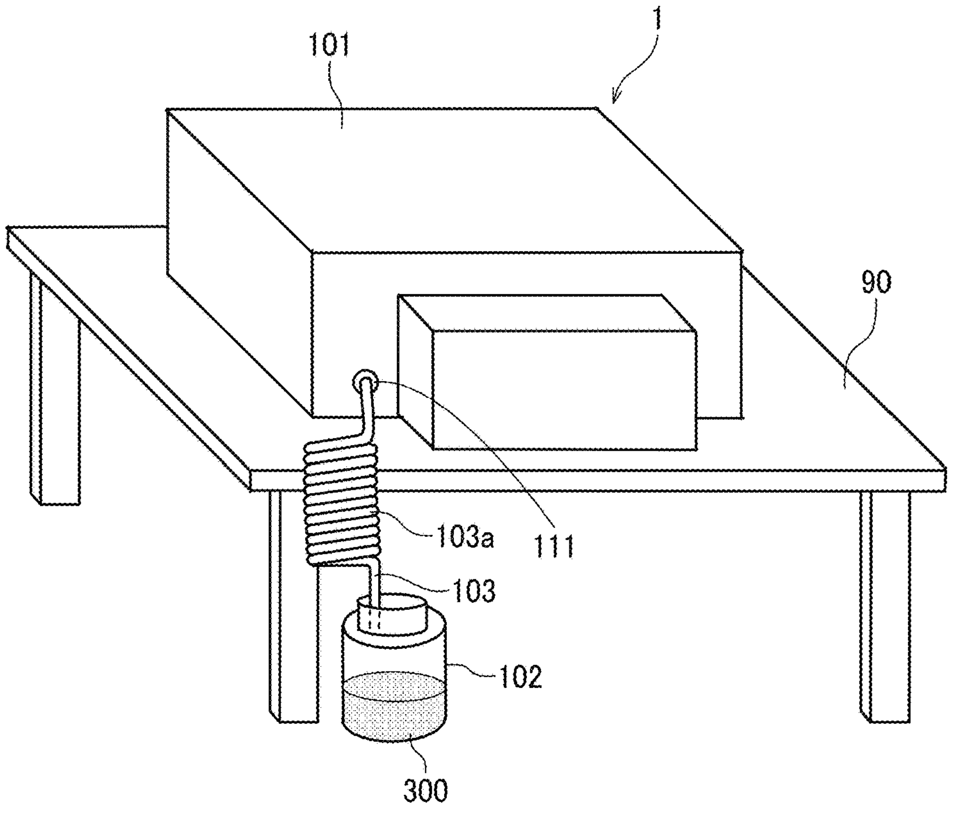
FIG. 4 is a schematic perspective view of the printer during usage to illustrate a discharge tube according to the first embodiment of the present disclosure.

FIG. 4 is a schematic perspective view of the printer 1 during usage to illustrate the waste liquid tube 103 according to the first embodiment of the present disclosure.

The printer 1 according to the first embodiment includes a waste liquid tube 103, a waste-liquid tube connection port 111, and a waste liquid bottle 102. Hereinafter, the "waste-liquid tube connection port" is simply referred to as a "connection port". The connection port serves as a coupling portion of the apparatus body 101 to which the waste liquid tube 103 is coupled. The connection port 111 is provided at a rear end part of an apparatus body 101 of the printer 1. The waste liquid bottle 102 serves as a waste liquid container to store a waste liquid. The waste liquid tube 103 connects the connection port 111 and the waste liquid bottle 102.

The waste liquid tube 103 is a curled tube made of a flexible member. The waste liquid tube 103 includes a spiral structure portion 103*a*. The spiral structure portion 103*a* of the waste liquid tube 103 has a spiral shape extending downward in a gravity direction. The spiral shape (helical structure) of the spiral structure portion 103*a* may have a curved shape (curved structure) that moves (rises or falls) in a direction having a component orthogonal to a plane of rotation while the spiral structure portion 103*a* rotates.

With such configuration, one end portion (upper end in FIG. 4) of the waste liquid tube 103 is coupled to the connection port 111 of the printer 1 on a table 90 to discharge a waste liquid 300 in the printer 1 to the waste liquid bottle 102 outside the printer 1, for example. Another end (lower end in FIG. 4) of the waste liquid tube 103 is coupled to a waste liquid bottle 102. When the waste liquid tube 103 is coupled to the waste liquid bottle 102, the waste liquid tube 103 is arranged such that the spiral structure portion 103*a* becomes the spiral (helical) shape extending downward in the gravity direction. Thus, the spiral structure portion 103*a* has a helical shape extending downward in a gravity direction.

Thus, the waste liquid tube 103 is arranged in the gravity direction or along a direction continuously inclined in the gravity direction from a coupling portion (connection port 111) of the apparatus body 101 coupled to the waste liquid tube 103 toward the waste liquid bottle 102 (waste liquid container) for storing the waste liquid.

In the above configuration, when the connection port 111 of the printer 1 and the waste liquid bottle 102 are disposed close to each other, the waste liquid tube 103 can connect the printer 1 and the waste liquid bottle 102 with each other with almost no extension of the waste liquid tube 103. Thus, the waste liquid tube 103 according to the first embodiment can prevent occurrence of a vertical inversion portion (U-shaped portion) in a middle of the waste liquid tube 103. Thus, the waste liquid tube 103 according to the first embodiment can prevent stagnation of the waste liquid in the waste liquid tube 103.

Conversely, when the connection port 111 of the printer 1 and the waste liquid bottle 102 are disposed distant from each other, the spiral structure portion 103*a* of the waste liquid tube 103 extends like a cylindrical spring to connect the printer 1 and the waste liquid bottle 102 with each other. Thus, the spiral structure portion 103*a* a cylindrical spring configured to expand and contract.

Even in the above case, the waste liquid tube 103 can prevent the vertically inversion portion (U-shaped portion) in the middle of the waste liquid tube 103. Thus, the waste liquid tube 103 according to the first embodiment can prevent stagnation of the waste liquid in the waste liquid tube 103.

In the above way, the waste liquid tube 103 according to the first embodiment uses the spiral structure portion 103*a* made of a flexible member to adjust a length of a waste liquid discharge path (waste liquid tube 103) from the connection port 111 to the waste liquid bottle 102 (waste liquid container) appropriately so that the waste liquid tube 103 is prevented from having the U-shaped portion in the waste liquid discharge path (waste liquid tube 103). Thus, the waste liquid tube 103 according to the first embodiment can reduce stagnation of the waste liquid 300 in the waste liquid tube 103.

Comparative Example 1 is described below with reference to FIG. 5.

Figure 5:
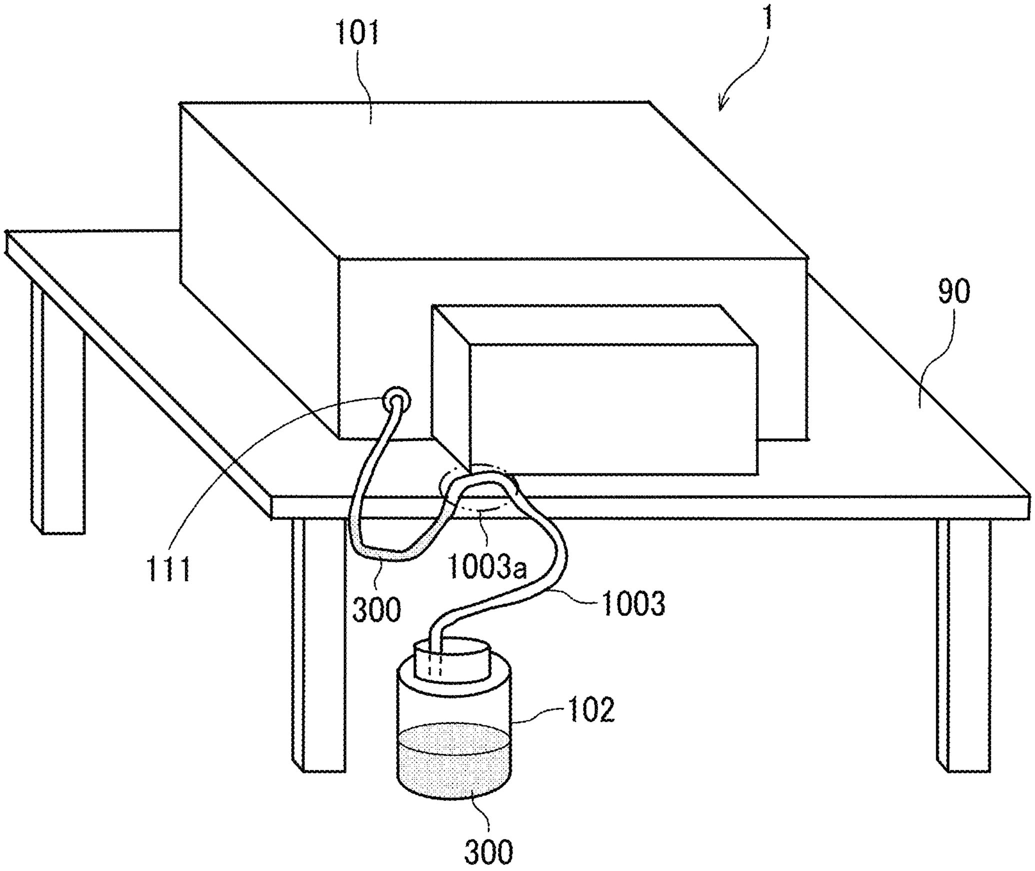
FIG. 5 is a schematic perspective view of the printer according to a Comparative Example 1.

FIG. 5 is a schematic perspective view of the printer 1 according to the Comparative Example 1.

In Comparative Example 1, a waste liquid tube 1003 having a straight shape is used.

In Comparative Example 1, when the waste liquid tube 1003 is too long compared to a distance between the printer 1 and the waste liquid bottle 102, an upward U-shaped bent portion 1003*a* may be formed in the middle of the waste liquid tube 1003 as illustrated in FIG. 5.

As described above, when the upward U-shaped bent portion 1003*a* is formed in the middle of the waste liquid tube 1003, the waste liquid 300 stays in the upward U-shaped bent portion 1003*a* and causes clogging in the waste liquid tube 1003 due to drying and solidification of the waste liquid 300 stayed in the middle of the waste liquid tube 1003. The waste liquid 300 stayed and solidified in the upward U-shaped bent portion 1003*a* may also obstruct a flow of the waste liquid 300 in the waste liquid tube 1003 that causes backflow of the waste liquid 300 in the waste liquid tube 1003.

Conversely, the waste liquid tube 103 according to the first embodiment does not form the upward U-shaped bent portion 1003*a* in the middle of the waste liquid tube 103. Thus, the waste liquid tube 103 according to the first embodiment can reduce stagnation of the waste liquid 300 in the waste liquid tube 103.

A waste liquid tube 103 according to a second embodiment of the present disclosure is described with reference to FIGS. 6A and 6B and FIGS. 7A and 7B.

Figure 6A:
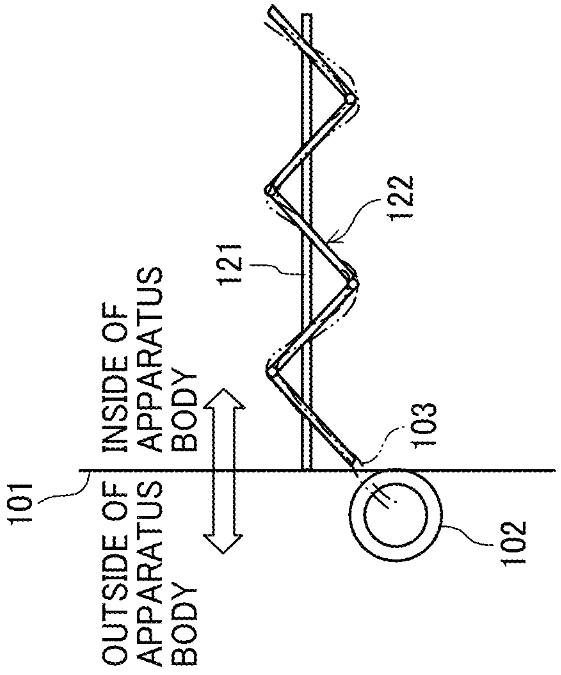
FIGS. 6A and 6B are schematic plan views of the waste liquid tube according to a second embodiment of the present disclosure.
Figure 6B:
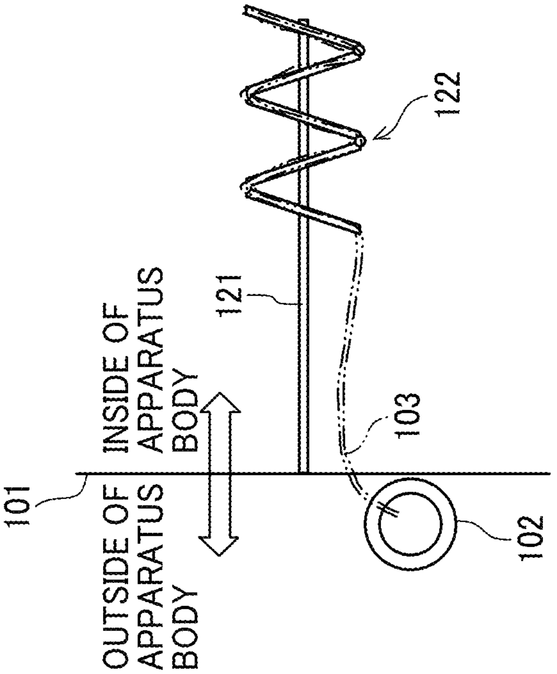

FIGS. 6A and 6B are schematic plan views of the waste liquid tube 103 according to the second embodiment of the present disclosure.

Figure 7B:
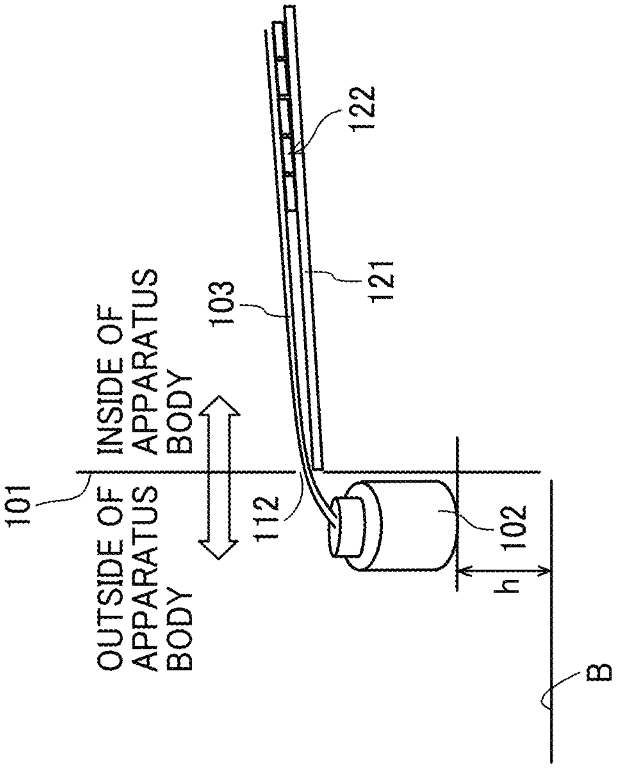
FIGS. 7A and 7B are schematic side views of the waste liquid tube according to the second embodiment of the present disclosure.
Figure 7A:
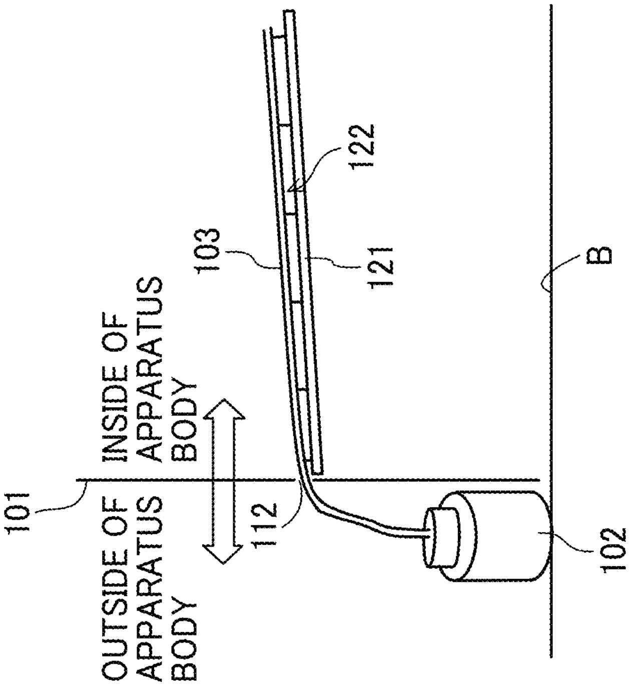

FIGS. 7A and 7B are schematic side views of the waste liquid tube 103 according to the second embodiment of the present disclosure.

FIGS. 6A and 7A each illustrates a state in which a link mechanism 122 is extended.

FIGS. 6B and 7B each illustrates a state in which the link mechanism 122 is contracted. Further, in FIGS. 6A and 6B, the waste liquid tube 103 is illustrated by an imaginary line for ease of viewing.

The printer 1 according to the second embodiment includes the link mechanism 122 inside the apparatus body 101. The link mechanism 122 can be folded and unfolded along a guide 121 so that the link mechanism 122 can be expandable and contractable along the guide 121. The link mechanism 122 holds the waste liquid tube 103 formed of a flexible member.

The link mechanism 122 is gradually inclined downward toward an outlet side (outside) of the apparatus body 101 (left side in FIGS. 6A and 6B) of the waste liquid tube 103. The link mechanism 122 is expandable so that the waste liquid tube 103 is continuously inclined in the gravity direction.

Thus, the link mechanism 122 is configured to hold the waste liquid tube 103 to expand and contract the waste liquid tube 103.

Thus, the waste liquid tube 103 is arranged in the gravity direction or in a direction continuously inclined in the gravity direction from the coupling portion of the waste liquid tube 103 coupled to the apparatus body 101 (connection port 111 side) toward the waste liquid bottle 102 (waste liquid container) for storing the waste liquid when the waste liquid is discharged from the connection port 111 to the waste liquid bottle 102.

Therefore, the waste liquid tube 103 according to the second embodiment can reduce backflow and stagnation of the waste liquid 300 in the waste liquid tube 103.

Unlike the first embodiment, the waste liquid tube 103 according to the second embodiment also serves as a waste liquid discharge outside the apparatus body 101, or is directly drawn out of the apparatus body 101 without being fixed to an exterior of the apparatus body 101.

Here, states illustrated in FIG. 6A and FIG. 7A are states in which the waste liquid bottle 102 is installed on a floor surface B (see FIG. 7A), for example. The states illustrated in FIG. 6B and FIG. 7B are states in which the waste liquid bottle 102 is raised from the floor surface B by a height "h", for example. Therefore, in the states illustrated in FIGS. 6B and 7B, a waste liquid tube outlet 112 of the printer 1 and the waste liquid bottle 102 are disposed closer to each other than in the states illustrated in FIGS. 6A and 7A.

With the above configuration, when the waste liquid tube outlet 112 of the printer 1 and the waste liquid bottle 102 are close to each other, the link mechanism 122 is contracted to draw the waste liquid tube 103 into the apparatus body 101 as illustrated in FIGS. 6B and 7B. Thus, the waste liquid tube 103 can reduce a tube length of the waste liquid tube 103 extending outside the apparatus body 101.

Conversely, when the printer 1 and the waste liquid bottle 102 are far from each other, the link mechanism 122 is extended to feed the waste liquid tube 103 outside the apparatus body 101 as illustrated in FIGS. 6A and 7A. Therefore, the waste liquid tube 103 can increase the tube length of the waste liquid tube 103 extending outside the apparatus body 101.

In the above way, the waste liquid tube 103 according to the second embodiment can reduce stagnation of the waste liquid 300 inside the waste liquid tube 103 since the link mechanism 122 can adjust a tube length of the waste liquid tube 103 extending outside the apparatus body 101 of the waste liquid tube 103. The waste liquid tube 103 according to the second embodiment uses a flexible member such as the link mechanism 122 to adjust a length of a waste liquid discharge (waste liquid tube 103) from the connection port 111 to the waste liquid bottle 102 (waste liquid container) appropriately so that the waste liquid tube 103 can prevent an occurrence of the upward U-shaped bent portion 1003*a* in the waste liquid discharge (waste liquid tube 103). Thus, the waste liquid tube 103 according to the first embodiment can reduce stagnation of the waste liquid 300 in the waste liquid tube 103.

A waste liquid tube 103 according to a third embodiment of the present disclosure is described with reference to FIGS. 8 and 9.

Figure 8:
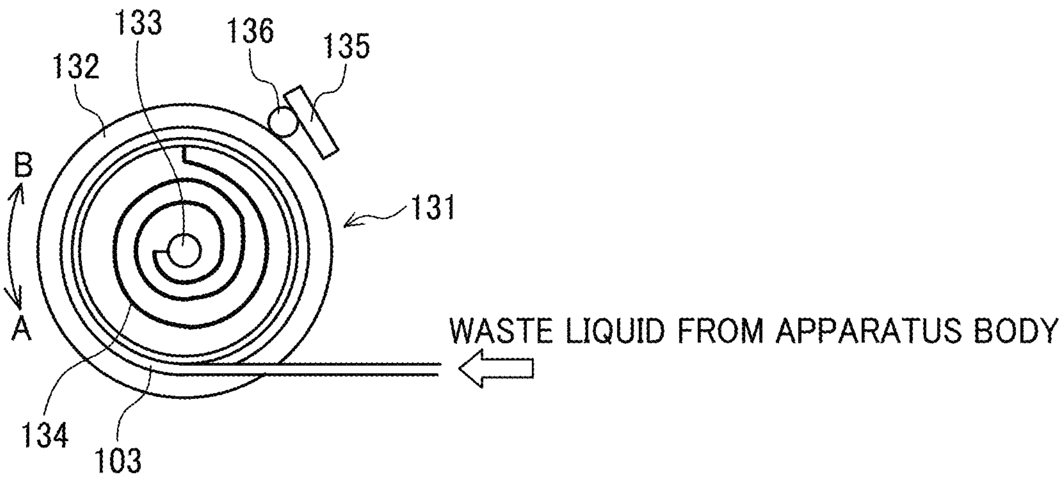
FIG. 8 is a schematic plan view of the waste liquid tube according to a third embodiment of the present disclosure.

FIG. 8 is a schematic plan view of the waste liquid tube 103 according to the third embodiment.

Figure 9:
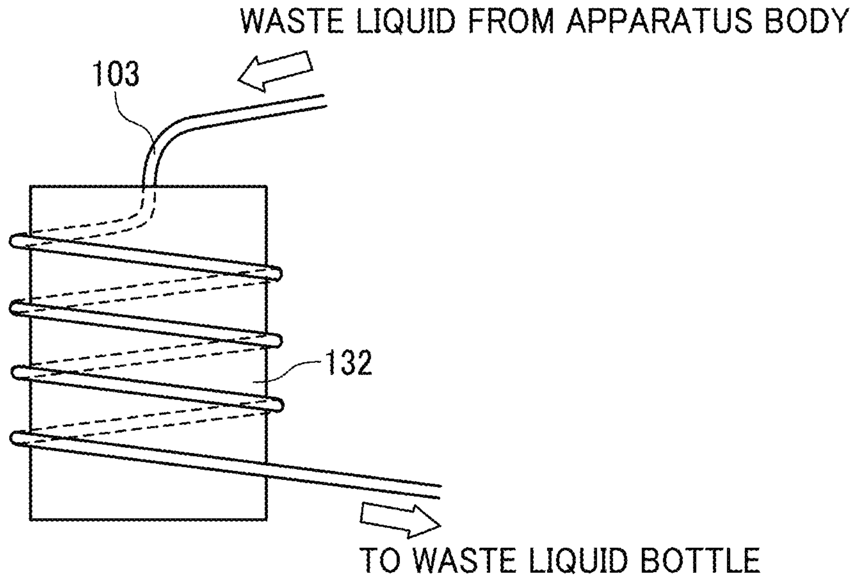
FIG. 9 is a schematic side view of the waste liquid tube according to the third embodiment of the present disclosure.

FIG. 9 is a schematic view of the waste liquid tube 103 according to the third embodiment of the present disclosure.

The printer 1 according to the third embodiment includes a winder 131 (coiler) to unwind (uncoil) and rewind (coil) the waste liquid tube 103 inside the apparatus body 101.

The winder 131 (coiler) includes a reel 132 that is a rotator to wind the waste liquid tube 103 having flexibility around the reel 132. The reel 132 is freely rotatably fitted to a fixed shaft 133. The waste liquid tube 103 is wound around the reel 132 such that an inlet side (apparatus body 101 side) of the waste liquid tube 103 faces upward, and an outlet side (waste liquid bottle 102 side) of the waste liquid tube 103 faces downward as illustrated in FIG. 9. The waste liquid 300 is fed from the inlet side (upper side in FIG. 9) of the waste liquid tube 103 and is discharged from the outlet side (lower side in FIG. 9) of the waste liquid tube 103 to the waste liquid bottle 102.

Thus, the waste liquid tube 103 is arranged in the gravity direction or in a direction continuously inclined in the gravity direction from the coupling portion of the waste liquid tube 103 coupled to the apparatus body 101 (connection port 111 side) toward the waste liquid bottle 102 (waste liquid container) for storing the waste liquid.

Further, the waste liquid tube 103 is fed out from the reel 132 and wound up by a guide or the like to prevent a vertical position of the waste liquid tube 103 to be reversed.

The printer 1 includes a spiral spring 134 between the reel 132 and the shaft 133. The spiral spring 134 is wound when the reel 132 rotates in a direction indicated by arrow "A" in FIG. 8.

The printer 1 includes a stopper 136 between an outer peripheral surface of the reel 132 and a fixed wall 135. The stopper 136 is separable from a position between the outer peripheral surface of the reel 132 and the fixed wall 135 by an advancing and retreating device or the like.

With the above configuration, when the waste liquid tube 103 is fed (pulled) in the direction indicated by the arrow A (rightward direction in FIG. 8), the reel 132 rotates in a counterclockwise direction indicated by the arrow A and the spiral spring 134 is wound. At the above time, the reel 132 can continue to rotate without being locked by the stopper 136 since the stopper 136 comes out of the position between the fixed wall 135 and the reel 132 according to a rotation of the reel 132.

Then, after the waste liquid tube 103 is pulled out to a required position, the tension of the waste liquid tube 103 disappears so that the reel 132 tries to rotate in a direction indicated by arrow "B" (clockwise direction) by the spiral spring 134. At the above time, the stopper 136 bites between the fixed wall 135 and the reel 132 and stops the rotation of the reel 132.

Conversely, when the waste liquid tube 103 is wound around the reel 132, the stopper 136 is separated from the position between the reel 132 and the fixed wall 135 so that the reel 132 is rotated in the direction indicated by the arrow B (clockwise direction) by a restoring force of the spiral spring 134. Thus, the waste liquid tube 103 is rewound onto the reel 132.

Thus, the waste liquid tube 103 can adjust a tube length of the waste liquid tube 103 extending outside the apparatus body 101. Thus, the waste liquid tube 103 according to the third embodiment can prevent stagnation of the waste liquid in the waste liquid tube 103. The waste liquid tube 103 according to the third embodiment uses a flexible member such as the reel 132 to adjust a length of a waste liquid discharge (waste liquid tube 103) from the connection port 111 to the waste liquid bottle 102 (waste liquid container) appropriately so that the waste liquid tube 103 can prevent an occurrence of the upward U-shaped bent portion 1003*a* in the waste liquid discharge (waste liquid tube 103). Thus, the waste liquid tube 103 according to the third embodiment can reduce stagnation of the waste liquid 300 in the waste liquid tube 103.

Figure 10A:
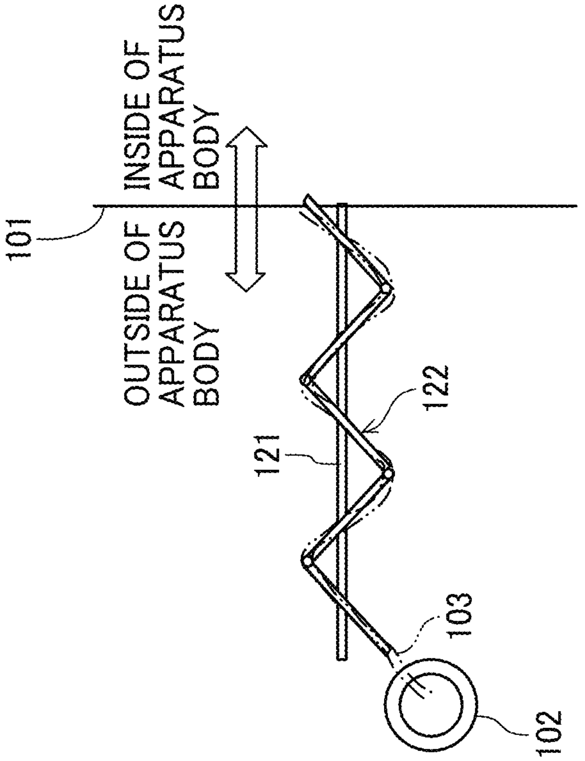
FIGS. 10A and 10B are schematic plan views of the waste liquid tube according to a fourth embodiment of the present disclosure.
Figure 10B:
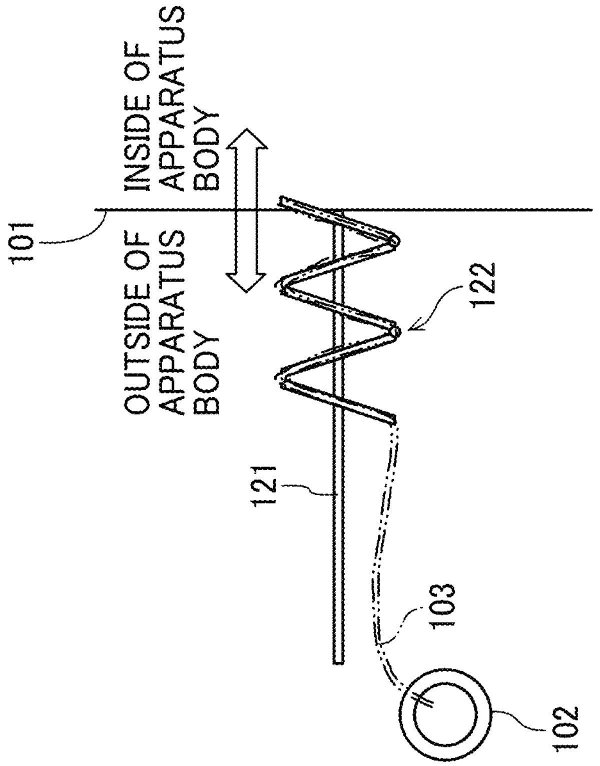

The waste liquid tube 103 according to a fourth embodiment of the present disclosure is described with reference to FIGS. 10A and 10B. FIGS. 10A and 10B are schematic plan views of the waste liquid tube 103 according to the fourth embodiment.

FIG. 10A illustrates a state in which a link mechanism 122 is expanded.

FIG. 10B illustrates a state in which the link mechanism 122 is contracted.

Further, in FIGS. 10A and 10B, the waste liquid tube 103 is illustrated by an imaginary line for ease of viewing.

The printer 1 according to the fourth embodiment includes a link mechanism 122 according to the second embodiment outside the apparatus body 101. The link mechanism 122 according to the fourth embodiment is expandable and contractable similarly to the link mechanism 122 according to the second embodiment. Other configurations of the printer 1 according to the fourth embodiment are identical to configurations of the printer 1 according to the second embodiment as described above, and thus an explanation of which are omitted.

Thus, the waste liquid tube 103 according to the third embodiment can prevent stagnation of the waste liquid in the waste liquid tube 103 as described in the above-described embodiments. The waste liquid tube 103 according to the third embodiment uses a flexible member such as the link mechanism 122 to adjust a length of a waste liquid discharge (waste liquid tube 103) from the connection port 111 to the waste liquid bottle 102 (waste liquid container) appropriately so that the waste liquid tube 103 can prevent an occurrence of the upward U-shaped bent portion 1003*a* in the waste liquid discharge (waste liquid tube 103). Thus, the waste liquid tube 103 according to the fourth embodiment can reduce stagnation of the waste liquid 300 in the waste liquid tube 103.

In the above-described embodiments, the printer as the liquid discharge apparatus for discharging a liquid onto cloth as a liquid application target (member) is described. However, the liquid discharge apparatus is not limited to such embodiments.

The liquid discharge apparatus according to the present embodiment also includes a liquid discharge tube installed in an arrangement of the waste liquid tube 103 defined in the above-described embodiments when connecting a coupling portion of the waste liquid tube on an apparatus body 101 side (connection port 111 side) to the waste liquid bottle 102 (waste liquid container) for storing a waste liquid with a tube. The liquid discharge apparatus according to the present embodiment may also include the waste liquid tube installed in an arrangement defined in the above-described embodiments.

In the present embodiments, a "liquid" discharged from the head is not particularly limited as long as the liquid has a viscosity and surface tension of degrees dischargeable from the head. Preferably, the viscosity of the liquid is not greater than 30 mPa·s under ordinary temperature and ordinary pressure or by heating or cooling.

Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant.

Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and opposed electrodes.

The "liquid discharge apparatus" may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, a three-dimensional fabrication apparatus (solid-object fabricating apparatus) to discharge a fabrication liquid to a powder layer in which powder material is formed in layers to form a three-dimensional fabrication object (solid fabrication object), or a three-dimensional fabrication apparatus to discharge a model material and a support material onto a stage to fabricate materials in layers to form a three-dimensional object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material onto which liquid can adhere" represents a material on which liquid is at least temporarily adhered, a material on which liquid is adhered and fixed, or a material into which liquid is adhered to permeate.

Examples of the "material onto which liquid can adhere" include recording media, such as paper sheet, recording paper, recording sheet of paper, film, and cloth, electronic component, such as electronic substrate and piezoelectric element, and media, such as powder layer, organ model, and testing cell. The "material on which liquid can adhere" includes any material on which liquid adheres unless particularly limited.

The "liquid discharge apparatus" may be an apparatus to relatively move the head and a material on which liquid can adhere. However, the liquid discharge apparatus is not limited to such an apparatus. For example, the liquid discharge apparatus may be a serial head apparatus that moves the head or a line head apparatus that does not move the head.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:

an apparatus body;

a liquid discharge head in the apparatus body, the liquid discharge head configured to discharge a liquid; and a waste liquid tube coupled to a coupling portion of the apparatus body, the waste liquid tube having flexibility and at least partially including a spiral structure portion in the waste liquid tube, the waste liquid tube configured to discharge, outside the apparatus body, a waste liquid discharged from the liquid discharge head, wherein the waste liquid tube is coupled to a waste liquid container outside the apparatus body, wherein the waste liquid tube is configured to be disposed such that the waste liquid tube has a continuous incline in a gravity direction from the coupling portion toward the waste liquid container.

2. The liquid discharge apparatus according to claim 1, wherein the waste liquid tube is disposed in a gravity direction from the coupling portion toward the waste liquid container.

3. The liquid discharge apparatus according to claim 1, wherein the spiral structure portion has a helical shape extending downward in a gravity direction.

4. The liquid discharge apparatus according to claim 1, wherein the spiral structure portion is a cylindrical spring configured to expand and contract.

5. A liquid discharge apparatus comprising:

an apparatus body;

a liquid discharge head in the apparatus body, the liquid discharge head configured to discharge a liquid;

a waste liquid tube coupled to a coupling portion of the apparatus body, the waste liquid tube having flexibility, the waste liquid tube configured to discharge, outside the apparatus body, a waste liquid discharged from the liquid discharge head; and a link mechanism configured to hold the waste liquid tube to expand and contract the waste liquid tube, wherein the waste liquid tube is coupled to a waste liquid container outside the apparatus body, wherein the waste liquid tube is configured to be disposed such that the waste liquid tube has a continuous incline in a gravity direction from the coupling portion toward the waste liquid container.

6. The liquid discharge apparatus according to claim 5, wherein the waste liquid tube is disposed in a gravity direction from the coupling portion toward the waste liquid container.

7. The liquid discharge apparatus according to claim 5, wherein the link mechanism is inside the apparatus body, and the link mechanism is configured to be folded and unfolded along a guide.

8. The liquid discharge apparatus according to claim 5, wherein the link mechanism is outside the apparatus body, and the link mechanism is configured to be folded and unfolded along a guide.

9. A liquid discharge apparatus comprising:

an apparatus body;

a liquid discharge head in the apparatus body, the liquid discharge head configured to discharge a liquid;

a waste liquid tube coupled to a coupling portion of the apparatus body, the waste liquid tube having flexibility, the waste liquid tube configured to discharge, outside the apparatus body, a waste liquid discharged from the liquid discharge head; and a reel configured to rotate and wind the waste liquid tube around the reel, wherein the waste liquid tube is coupled to a waste liquid container outside the apparatus body, wherein the waste liquid tube is configured to be disposed such that the waste liquid tube has a continuous incline in a gravity direction from the coupling portion toward the waste liquid container.

10. The liquid discharge apparatus according to claim 9, wherein the waste liquid tube is disposed in a gravity direction from the coupling portion toward the waste liquid container.

11. The liquid discharge apparatus according to claim 9, further comprising:

a shaft to which the reel is rotatably fitted.

12. The liquid discharge apparatus according to claim 11, further comprising:

a spiral spring between the reel and the shaft.

13. The liquid discharge apparatus according to claim 9, further comprising:

a fixed wall;

a stopper between an outer peripheral surface of the reel and the fixed wall, wherein the stopper is separable from a position between the outer peripheral surface of the reel and the fixed wall.

* * * * *